United States Patent [19]

Miyoshi et al.

[11] 4,440,438
[45] Apr. 3, 1984

[54] REAR VEHICLE BODY STRUCTURE OF AN AUTOMOTIVE VEHICLE

[75] Inventors: Takao Miyoshi, Yokosuka; Sumio Inami, Atsugi, both of Japan

[73] Assignee: Nissan Motor Company, Limited, Yokohama, Japan

[21] Appl. No.: 308,679

[22] Filed: Oct. 5, 1981

[30] Foreign Application Priority Data

Oct. 31, 1980 [JP] Japan ................ 55-152261

[51] Int. Cl.³ ............................ B62D 25/16
[52] U.S. Cl. .................... 296/195; 296/198
[58] Field of Search ............ 296/195, 198, 193, 197, 296/187, 29; 293/126

[56] References Cited

U.S. PATENT DOCUMENTS 2,474,992  7/1949  Stephenson et al. ........... 296/195
2,662,793 12/1953  Lindsay ......................... 296/195
3,517,765  6/1970  Wessells et al. ............... 296/195

FOREIGN PATENT DOCUMENTS 1182537 11/1964 Fed. Rep. of Germany .
1455707  5/1969 Fed. Rep. of Germany .
 851332 10/1960 United Kingdom .

Primary Examiner—Joseph F. Peters, Jr.
Assistant Examiner—Ross Weaver

[57] ABSTRACT

Herein disclosed is a rear vehicle body structure of an automotive vehicle which comprises a pair of rear wheel houses each covering a rear wheel and including a rear wheel house outer panel having a lower portion and a rear wheel house inner panel secured to the rear wheel house outer panel; a pair of rear fender panels each secured to the rear wheel house outer panel; and a rear floor panel having lateral ends each in part secured to the rear wheel house inner panel. The rear wheel house outer panel partially extends downwardly from the rear floor panel and projects outwardly from the lateral end of the rear floor panel and has an outer peripheral portion curved toward the axis of rotation of the rear wheel. The rear fender panel has a rear lower end in part secured to the lateral end of the rear floor panel projecting rearwardly from the rear wheel house, the rear lower end of the rear fender panel in part extending across and secured to the lower portion of the rear wheel house outer panel.

3 Claims, 5 Drawing Figures

REAR VEHICLE BODY STRUCTURE OF AN AUTOMOTIVE VEHICLE

FIELD OF THE INVENTION

The present invention relates to a rear vehicle body structure of an automotive vehicle and, more particularly, to a rear vehicle body structure such as used for a passenger automotive vehicle.

SUMMARY OF THE INVENTION

In accordance with the present invention, there is provided a rear vehicle body structure of an automotive vehicle which comprises a pair of rear wheel houses each covering a rear wheel and including a rear wheel house outer panel having a lower portion and a rear wheel house inner panel secured to the rear wheel house outer panel; a pair of rear fender panels each secured to the rear wheel house outer panel; and a rear floor panel having lateral ends each in part secured to the rear wheel house inner panel; wherein the rear wheel house outer panel partially extends downwardly from the rear floor panel, the rear wheel house outer panel projecting outwardly from the lateral end of the rear floor panel and having an outer peripheral portion curved toward the axis of rotation of the rear wheel, and wherein the rear fender panel has a rear lower end in part secured to the lateral end of the rear floor panel projecting rearwardly from the rear wheel house, the rear lower end of the rear fender panel in part extending across and secured to the lower portion of the rear wheel house outer panel.

BRIEF DESCRIPTION OF THE DRAWINGS

Drawbacks of a prior-art rear vehicle body structure of an automotive vehicle and the details of the rear vehicle body structure according to the present invention will be understood from the following description taken in conjunction with the accompanying drawings in which.

DESCRIPTION OF THE PRIOR ART

Figure 1:
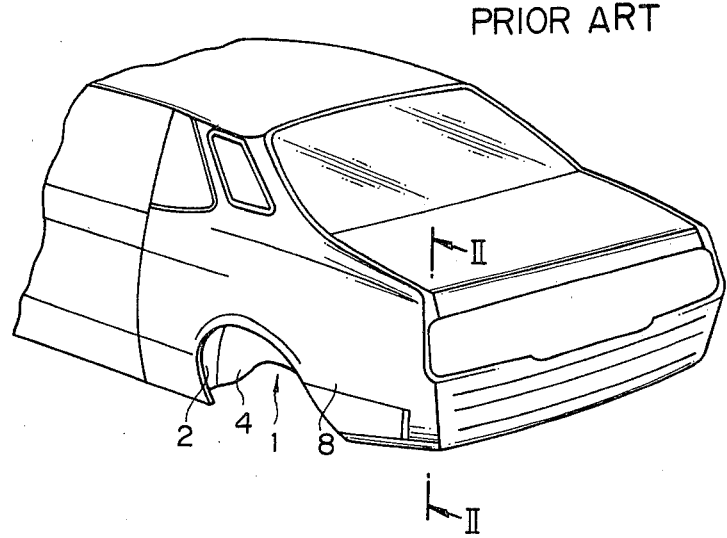
FIG. 1 is a fragmentary perspective view of a prior-art rear vehicle body structure of an automotive vehicle.
Figure 2:
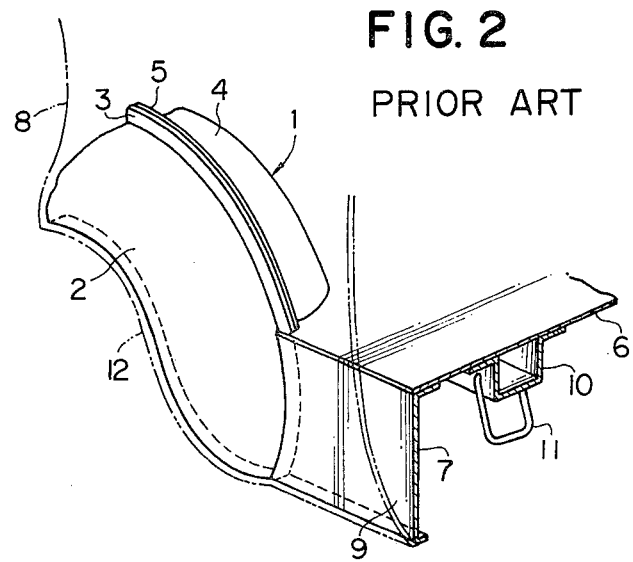
FIG. 2 is a cross sectional view taken on line II—II of FIG. 1.

Conventionally, there have been proposed a wide variety of such rear vehicle body structures of automotive vehicles one of which is shown in FIGS. 1 and 2. The rear vehicle body structure therein shown comprises a pair of rear wheel houses 1 only one of which is shown as being generally shell-shaped for the sake of covering a rear wheel as is well known in the art. Each of the rear wheel houses 1 consists of a rear wheel house outer panel 2 having a flange portion 3 integrally formed along its lterally inner end, and a rear wheel house inner panel 4 having a flange portion 5 integrally formed along its laterally outer end and seam welded to the flange portion 3 of the rear wheel house outer panel 2. The rear vehicle body structure further comprises a horizontal rear floor panel 6 which is spot welded at each of its lateral ends each of to the rear wheel house inner panel 4 each of the lateral ends in part extending rearwardly from the rear wheel house 1 in alignment with the flange portion 3 of the rear wheel house outer panel 2, and a pair of rear floor side panels 7 each of which extends perpendicularly to and downwardly from the rear floor panel 6 in such a manner that each of the rear floor side panels 7 has an upper end portion bent inwardly and welded to the rear floor panel 6, a lower end flush with the lower end of the rear wheel house outer panel 2 and bent inwardly, and a front end portion spot welded to the outer surface of the flange portion 3 of the rear wheel house outer panel 2. In the prior-art rear vehicle body structure of the automotive vehicle, there are further provided a pair of rear fender panels 8 each of which has a rear lower end portion spot welded to the lower end portion of the rear floor side panel 7 and to the rear wheel house outer panel 2 along a tire opening line 12 formed along the laterally outer end of the rear wheel house outer panel 2 so that a space 9 is formed between the rear floor side panel 7 and the rear lower portion of the rear fender panel 8 so as to enable tools and the like to be accommodated therein. To the lower surface of the rear floor panel 6 are welded a pair of spaced and parallel side members 10 each of which is generally channel-shaped and which is adapted to support a tie-down hook 11 for hauling a suitable land vehicle.

In the foregoing prior-art rear vehicle body structure, the rear fender panel 8 is welded at its lower end to the rear wheel house outer panel 2 along the tire opening line 12 and to the lower end portion of the rear floor side panel 7 as has been described. By virtue of the described construction, the weld line of the rear fender panel 8 is smoothly curved along the tire opening line 12 of the rear wheel house outer panel 2 in the fore-and-aft direction of the automotive vehicle, thereby resulting in deteriorating flexural rigidity of the plate of the rear fender panel 8. Even if the rear fender panel 8 is spot welded to the rear wheel house outer panel 2 and the rear floor side panel 7 is previously mentioned, the rear fender panel 8 is unable to be reliably supported by the rear wheel house outer panel 2 and the rear floor side panel 7. It therefore follows that the rear fender panel 8 tends to be deformed especially when a relatively large external force is exerted on the tie-down hook 11 attached to the side member 10. On the other hand, pebbles, gravels and the like are liable to come into collision against the lower end portion of the rear fender panel 8, thereby resulting in the rear fender panel 8 being damaged and rusted by the reason that the rear lower end of the rear fender panel 8 is located on a horizontal plane substantially flush with the lower end of the rear wheel house outer panel 2.

The present invention contemplates provision of an improved rear vehicle body structure of an automotive vehicle which will eliminate such drawbacks inherent in a prior-art rear vehicle body structure.

DESCRIPTION OF THE EMBODIMENT

Figure 3:
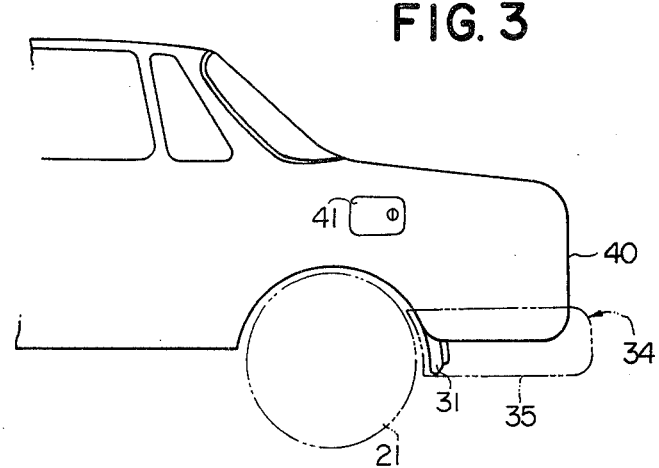
FIG. 3 is a fragmentary rear side view of an automotive vehicle having a rear vehicle body structure to which the present invention appertains.
Figure 5:
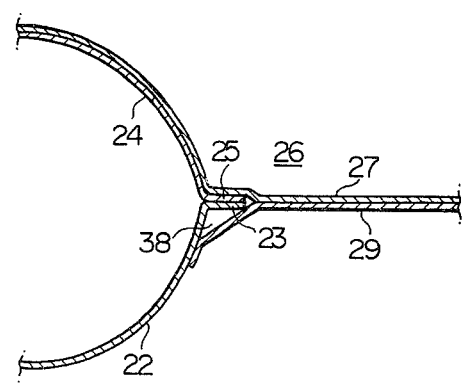
FIG. 5 is a fragmentary cross sectional view taken on line V—V of FIG. 4.
Figure 4:
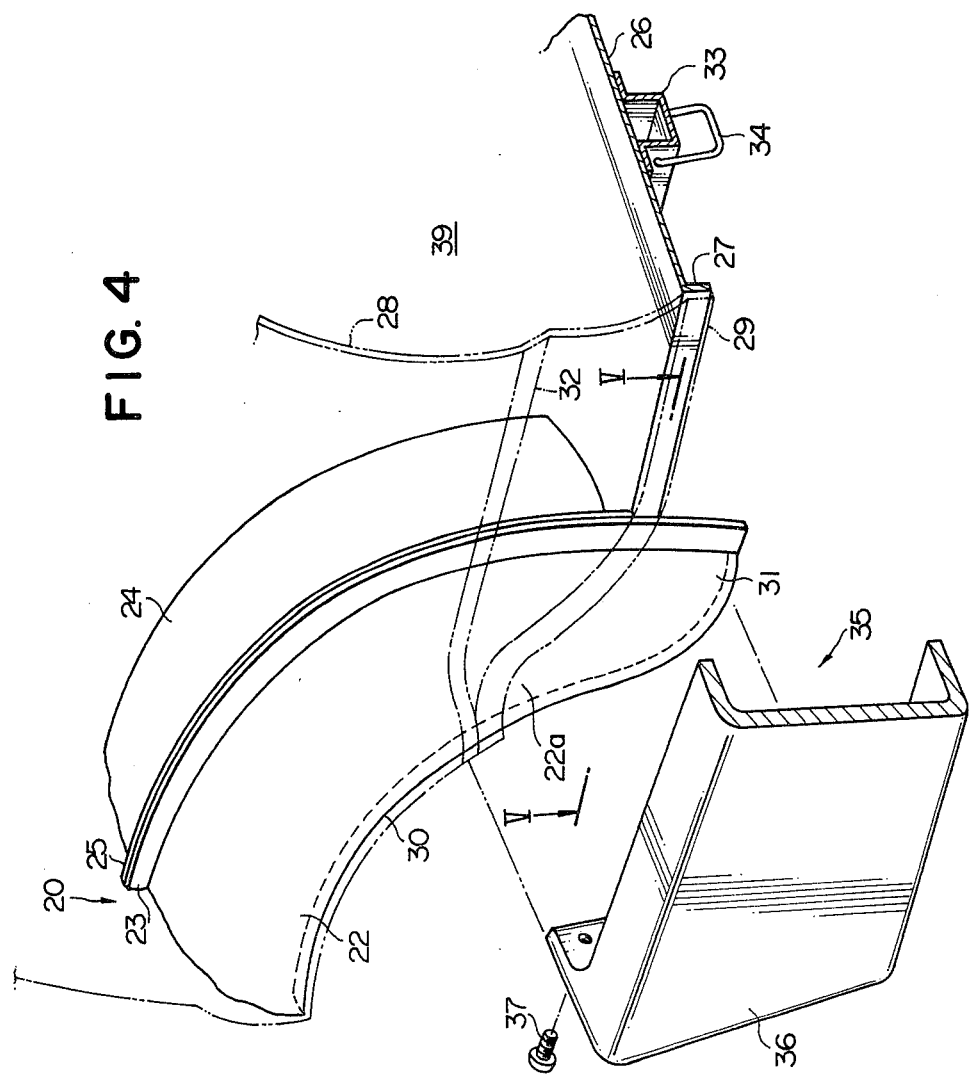
FIG. 4 is a fragmentary cross sectional view taken on line IV—IV of FIG. 3 and showing, to an enlarged scale, panels and members forming part of the rear vehicle body structure according to the present invention together with a rear bumper disassembled from a rear wheel house of the rear vehicle body structure.

FIGS. 3 to 5 show an embodiment of the rear vehicle body structure according to the present invention. Similarly to the prior-art rear vehicle body structure, the embodiment herein shown comprises a pair of rear wheel houses 20 only one of which is shown as being generally shell-shaped for the sake of covering a rear wheel 21. Each of the rear wheel houses 20 consists of a rear wheel house outer panel 22 having a flange portion 23 integrally formed along its laterally inner end and a laterally outer end portion curved away from the flange portion 23 toward the axis of rotation of the rear wheel 21, and a rear wheel house inner panel 24 having a flange portion 25 integrally formed along its laterally outer end. The rear wheel house inner panel 24 is secured to the rear wheel house outer panel 22 in such a manner that the flange portion 25 of the rear wheel house inner panel 24 is seam welded or otherwise securely connected to the flange portion 23 of the rear wheel house outer panel 22. The rear vehicle body structure further comprises a horizontal rear floor panel 26 having along each of its lateral ends a flange portion 27 in part extending along the rear wheel house inner panel 24 and spot welded to the rear wheel house inner panel 24. The flange portion 27 further in part extends downwardly and rearwardly from the rear wheel house 20 in alignment with the flange portion 25 of the rear wheel house inner panel 24. This means that the rear wheel house outer panel 22 is located outwardly of the lateral end of the rear floor panel 26. A pair of rear fender panels 28 are provided, each of which has along its rear lower end a flange portion 29. The rear fender panel 28 is in part secured along its rear lower end to the lateral end portion of the rear floor panel 26 projecting rearwardly from the rear wheel house 20 in such a manner that the flange portion 29 of the rear fender panel 28 is in part spot welded or otherwise securely connected to the flange portion 27 of the rear floor panel 26. In the embodiment of the present invention, the rear wheel house outer panel 22 has a lower portion 22a, and the flange portion 29 of the rear fender panel 28 in part extends across and is spot welded or otherwise securely connected to the lower portion 22a of the rear wheel house outer panel 22. Further, the rear lower end of the fender panel 28 is in part spot welded or otherwise securely connected to the rear wheel house outer panel 22 along a tire opening line 30 formed along the laterally outer end of the rear wheel house outer panel 22. The rear wheel house outer panel 22 partially extends downwardly below the rear floor panel 26 and forms a mudguard 31 partially covering the rear wheel 21 for preventing pebbles, gravels and the like from coming into collision against the rear lower end portion of the rear fender panel 28. The rear fender panel 28 is formed with an embossed line 32 extending in the fore-and-aft direction of the rear vehicle body structure and having a front end portion merged into the front end of the flange portion 29 of the rear fender panel 28 on the tire opening line 30 of the rear wheel house outer panel 22. Similarly to the prior-art rear vehicle body structure, a pair of spaced and parallel side members 33 generally are welded to the lower surface of the rear floor panel 26, each of the side members 33 supporting a tie-down hook 34 for hauling a suitable land vehicle.

In the embodiment of the present invention, a rear bumper 35 has a pair of side portions 36 each horizontally extending in spaced and parallel relationship to and along the flange portion 29 of the rear fender panel 28 for concealing the lower portion 22a of the rear wheel house outer panel 22, the rear lower end portion of the rear fender panel 28 and the lateral end portion of the rear floor panel 26 projecting rearwardly form the rear wheel hose 20, viz., the flange portions 27 and 29 of the rear floor panel 26 and the rear fender panel 28. Each of the side portions 35 of the rear bumper 35 is partially attached to and supported by the lower portion 22a of the rear wheel house outer panel 22 by means of suitable fastening means such as stud bolts 37.

With reference to FIG. 5, the embodiment illustrated therein further comprises a drain hole 38 which is shown as being formed along the laterally inner end of the rear wheel house outer panel 22 by the flange portion 29 of the rear fender panel 28, the flange portion 23 of the rear wheel house outer panel 22 and the outer surface of the rear wheel house outer panel 22 and being open to the exterior of a trunk room 39 defined by the rear fender panels 28, the rear floor panel 26, a rear end panel 40 (see FIG. 3) and a trunk lid (not shown). The drain hole 38 thus enables water penetrated into the trunk room 39 to be discharged therethrough to the exterior of the trunk room 39 for example in the event that a crack happened to be produced in a sealing member around a fuel filler lid 41 (see FIG. 3) and allowed such water to be penetrated into the trunk room 39.

As will be understood from the foregoing description of the embodiment according to the present invention, the laterally outer end portion of the rear wheel house outer panel 22 is curved toward the axis of rotation of the rear wheel 21 so that the rear wheel house outer panel 22 has a high flexural rigidity of the plate. The rear lower end portion of the rear fender panel 28 in part extends across and is secured to the lower portion of the rear wheel house outer panel 22 having a high flexural rigidity of the plate as just mentioned. In addition, the rear lower end of the rear fender panel 28 is in part secured to the lateral end of the rear floor panel 26 projecting rearwardly from the rear wheel house 20. This results in that the strength of the welded portion of the rear wheel house outer panel 22 and the lower portion of the rear fender panel 28 is enhanced as compared with that of the prior-art rear vehicle body structure. Furthermore, the rear lower end portion of the rear fender panel 28 has a radius of curvature smaller than that of the rear lower end portion of the rear fender panel 8 of the prior-art rear vehicle body structure so that the rear fender panel 28 is enhanced in flexural rigidity of the plate as compared with the rear fender panel 8 of the prior-art rear vehicle body structure. As a consequence, the rear fender panel 28 can be reliably supported by the rear wheel house outer panel 22 and the rear floor panel 26. The rear fender panel 28 is thus by no means deformed even if a relativeley large external force is exerted on the tie-down hook 33 by the reason that the strength of the welded portion of the rear fender panel 28 and the rear wheel house outer panel 22 and the flexural rigidity of the plate of the rear fender panel 28 can effectively bear the external force on the tie-down hook 33.

Still further, pebbles, gravels and the like are prevented from coming into direct collision against the rear fender panel 28 since the rear wheel house outer panel 22 partially extends downwardly from the rear floor panel 26 and forms a mudguard 31 partially covering the rear wheel 21.

What is claimed is:

1. A rear vehicle body structure of an automotive vehicle comprising: a pair of rear wheel houses each including a rear wheel house outer panel having a lower portion and a rear wheel house inner panel secured to the rear wheel house outer panel; a pair of rear fender panels each secured to the rear wheel house outer panel; and a rear floor panel having lateral ends and in part secured along each of its lateral ends to the rear wheel house inner panel; wherein said rear wheel house outer panel terminates below said rear fender panel and said rear floor panel, the rear wheel house outer panel projecting outwardly away from the lateral end of said rear floor panel and having a laterally outer portion curved in cross section toward the axis of rotation of said rear wheel, and wherein said rear fender panel has a rear lower end portion in part secured to the lateral end of said rear floor panel projecting rearwardly from said rear wheel house, the rear lower end portion of said rear fender panel in part extending across and secured to said lower portion of said rear wheel house outer panel.

2. A rear vehicle body structure of an automobile vehicle as set forth in claim 1, which further comprises a rear bumper having a pair of side portions each horizontally extending along the rear lower end portion of said rear fender panel and partially supported by said rear wheel house outer panel for concealing said lower portion of said rear wheel house outer panel, the rear lower end of said rear fender panel and the lateral end portion of said rear floor panel projecting rearwardly from said rear wheel house.

3. A rear vehicle body structure of an automobile vehicle as set forth in claim 1 or 2, in which the rear lower end portion of said rear fender panel and said rear wheel house outer panel form in combination a drain hole along the laterally inner end of said rear wheel house outer panel so as to enable water to be discharged therethrough.

* * * * *